INVENTOR.
George W. Baughman
BY W. L. Stout
HIS ATTORNEY

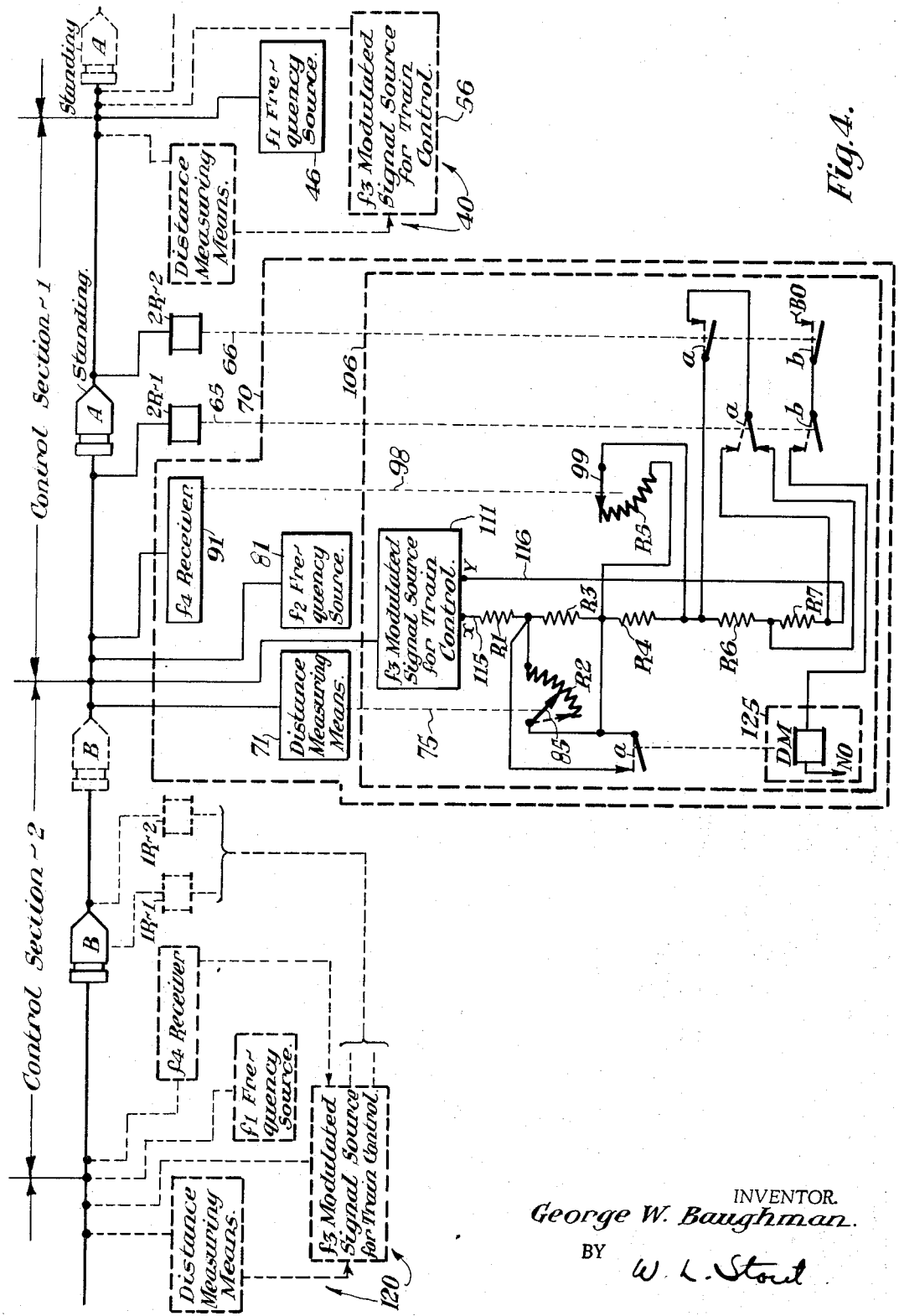

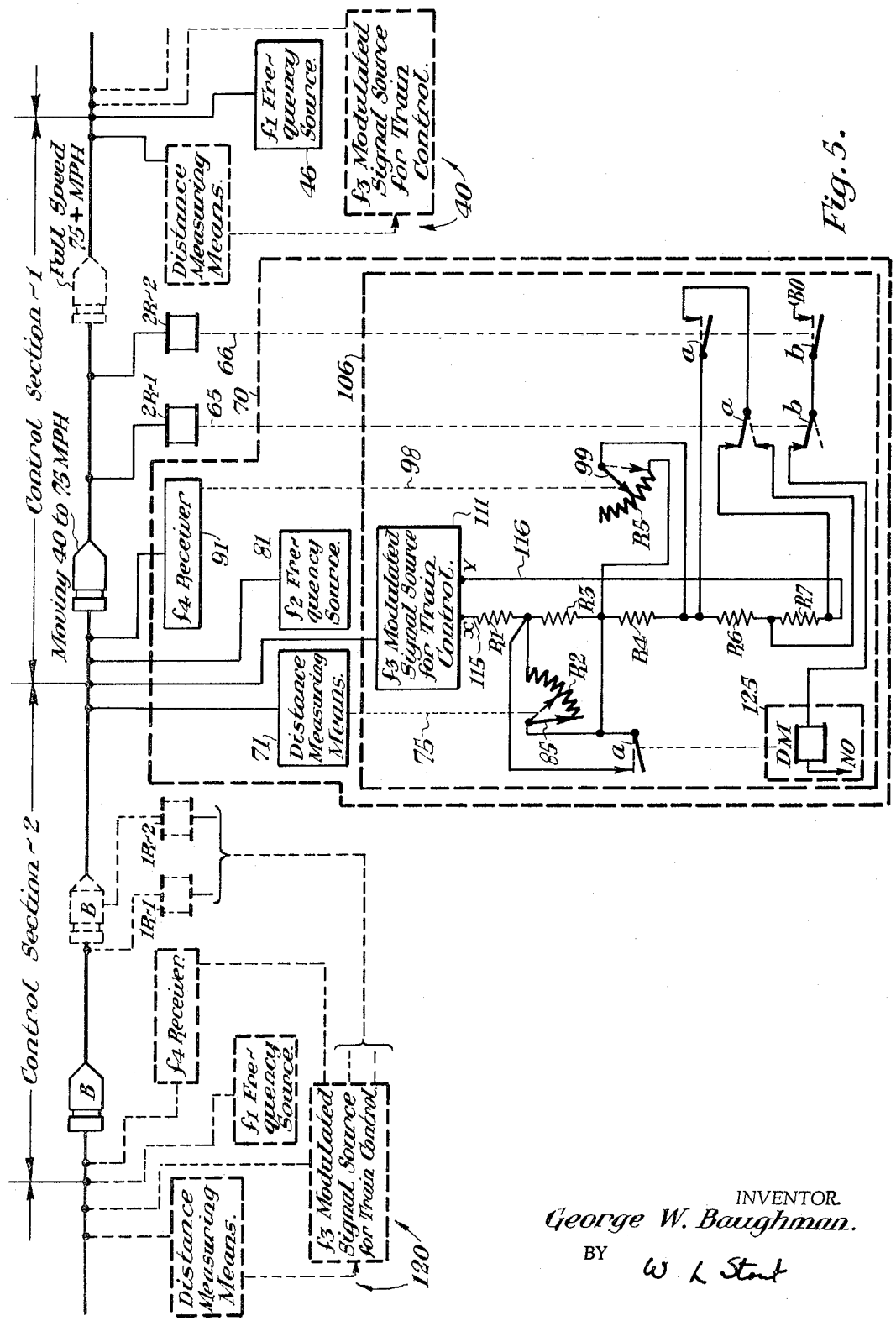

United States Patent Office 3,361,905
Patented Jan. 2, 1968

3,361,905
MOVABLE BLOCK VEHICLE SPEED
CONTROL SYSTEM
George W. Baughman, Swissvale, Pa., assignor to Westinghouse Air Brake Company, Swissvale, Pa., a corporation of Pennsylvania
Filed Jan. 18, 1966, Ser. No. 521,290
22 Claims. (Cl. 246—187)

This invention relates to an improved movable block, automatic speed control system for use in territory characterized by the presence of electrically continuous elements such as rails positioned along a predetermined way.

The invention to be described is an improvement over my copending applications for Letters Patent of the United States, Ser. No. 520,125, filed Jan. 12, 1966, for a Movable Block Train Speed Control System, and Ser. No. 523,293, filed Jan. 27, 1966, for An Improved Movable Block Vehicle Speed Control System. The first copending application noted was directed to the basic idea of controlling the speed of a following vehicle as a function of the actual speed of a lead vehicle. The second copending application noted added an additional factor in the speed control of the following vehicle. This factor took into account the distance a following vehicle was from a lead vehicle occupying a controlled section of the way.

In both of the just mentioned copending applications the systems described were drawn to environments where there were present a series of vehicle control sections made up of electrically conductive elements insulated one from the other, such as sections of rail separated by insulated joints.

Increasing demands to decrease headway between vehicles operating in a rapid, mass transit system, coupled with a desire to decrease the noise caused by vehicles traveling within the system have strained to the limits noise suppression and control techniques of vehicles which travel along a way over rails having insulated joints. While the copending applications noted above have vastly improved vehicle control with a concomitant increase in the distance between insulated joints, the use of welded electrically continuous rails is becoming increasingly desirable, both from the standpoint of noise reduction and maintenance. The need for close headway between vehicles and the precise stopping of a following train near the rear of a stopped or slowly moving lead vehicle is a real need that has been solved by the invention to be described.

It should be understood at the outset that, while the system to be described will be explained in a railway system, the technique of train or vehicle control to be described is equally applicable to systems where the control circuitry of the invention is positioned along the way.

The invention to be described allows for the very minimum of headway between trains or vehicles by the control of a following train or vehicle as a function of the actual speed of a lead train or vehicle and the relative distance between trains or vehicles with reference to a fixed point intermediate the trains or vehicles. The train or vehicle closest to the aforementioned point determines in part the speed of the following train or vehicle. The control of the following train or vehicle is also a function of the occupancy of the rails or way ahead of the train or vehicle as the train or vehicle proceeds.

It is therefore an object of this invention to provide a vehicle speed control system in which the headway between vehicles may be reduced by the utilization of a speed control signal delivered to a following vehicle, which speed control signal reflects both the speed of the lead vehicle, the relative distance between vehicles with reference to a point intermediate the vehicles, and finally the occupancy of the way approached by a train.

Another object of this invention is the provision of a positive fail-safe speed control of a minimum headway multi-vehicle rapid transit system.

Yet another object of this invention is the provision of a vehicle control system that may be readily and economically incorporated in a railway environment where electrically continuous rails are employed, thereby enhancing noise reduction while simultaneously providing precise vehicle control.

Another object of this invention is the provision of a precise vehicle stopping capability while simultaneously providing positive control of headway between vehicles.

A final object of this invention is to provide a movable block speed control system having maximum flexibility, efficiency and safety, at minimum cost.

In the attainment of the foregoing objects the invention will be described in a railway installation for the purpose of setting forth a preferred embodiment of the invention.

In the preferred embodiment a movable block train speed control system is provided in railway territory characterized by the presence of electrically continuous rails, and where each of the trains operating in the system has a train speed command receiver, and a train speed responsive transmitter which has an output signal which is effective in the control of following trains. This output signal is always indicative of a more restrictive train speed command than the equivalent train speed command which would produce the actual speed at which the train is traveling.

The rails upon which the train travels are divided into a series of consecutive train speed control sections defined by a plurality of spaced apart train control units.

Each of the train control units includes the following group of mechanisms: First, there is a train distance measuring mechanism coupled to the rails, which mechanism provides an output controlled mainly by the distance to a train nearest the point at which the distance measuring mechanism is coupled to the rails.

Secondly, a train detection signal source is coupled to the rails. The train detection signal source varies in character from any one train control unit to the next adjacent train control unit.

Thirdly, a wayside receiver which has an output indicative of the output signal received from a train which has just passed and is occupying the adjacent train control section entered.

Fourthly, a wayside variable signal transmitter which has an output signal which is received by the train speed command receiver and controls the speed of the train entering the preceding train control section.

Finally, a disabling mechanism to control the distance measuring mechanism.

The system further incorporates a train detection unit electrically coupled to the rails, positioned intermediate the ends of each train control section. The train detection unit energized by the aforementioned train detection signal source. The train detection unit's output controls the immediately preceding distance measuring unit to render the distance measuring unit ineffective when the next succeeding train control section approached in unoccupied. The train detection unit's output provides an addtional control to the immediately preceding wayside variable signal transmitter whenever a train is occupying the next succeeding train control section.

The wayside variable signal transmitter output of any one of the train control units is simultaneously controlled by the outputs from the train distance measuring mechanism, the wayside receiver and the next succeeding vehicle detection unit. These just noted outputs establish the need controls for trains following in consecutive train control sections.

Other objects and advantages of the present invention will become apparent from the ensuing description of illustrative embodiment thereof, in the course of which reference is had to the accompanying drawings in which.

FIGS. 3 to 5, inclusive, depict a variety of dynamic train traffic situations and the type of speed control provided by the invention.

A description of the above embodiments will follow and then the novel features of the invention will be presented in the appended claims.

Figure 1:
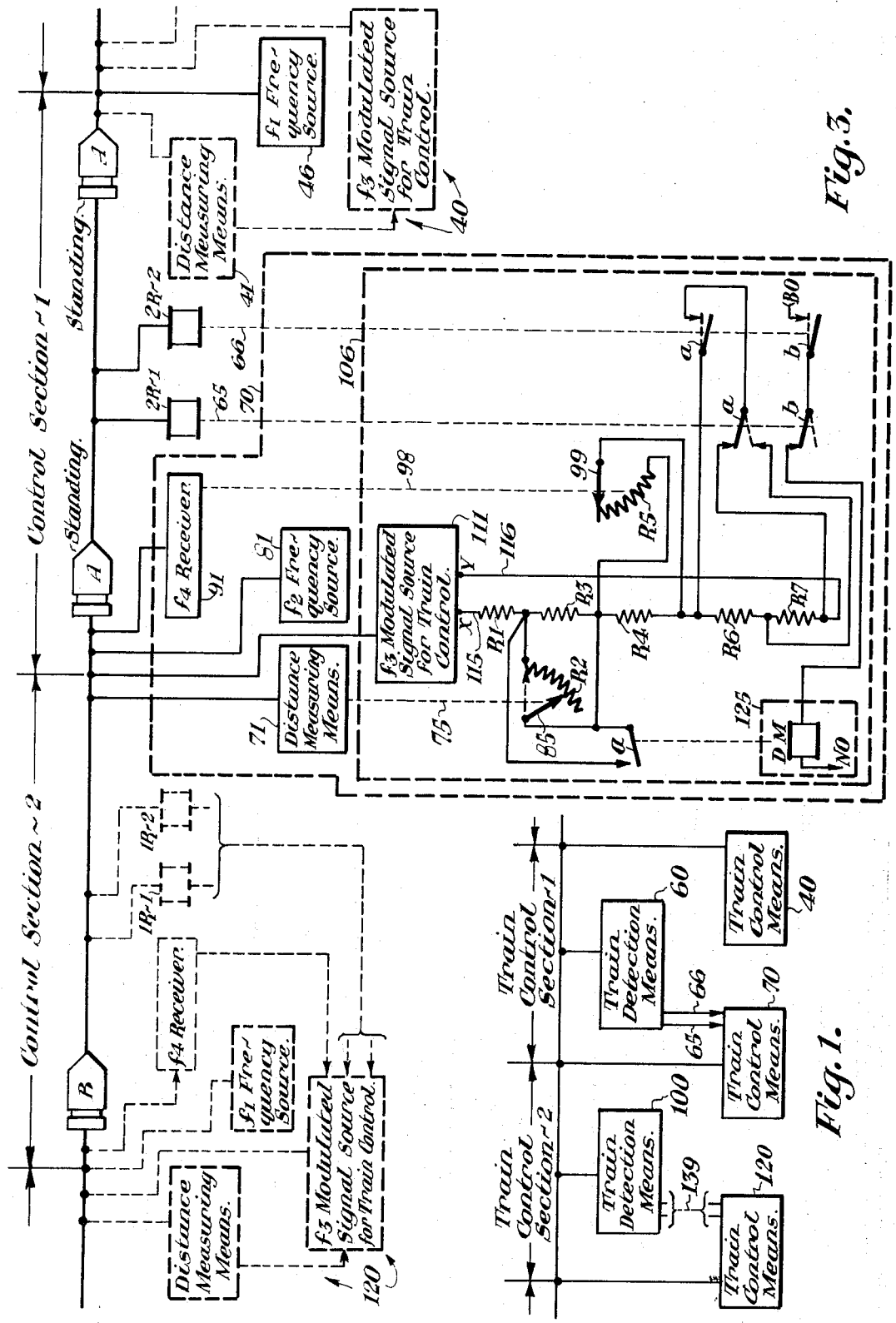
FIG. 1 illustrates in block diagram form an embodiment of the movable train speed control system of the invention.
Figure 2:
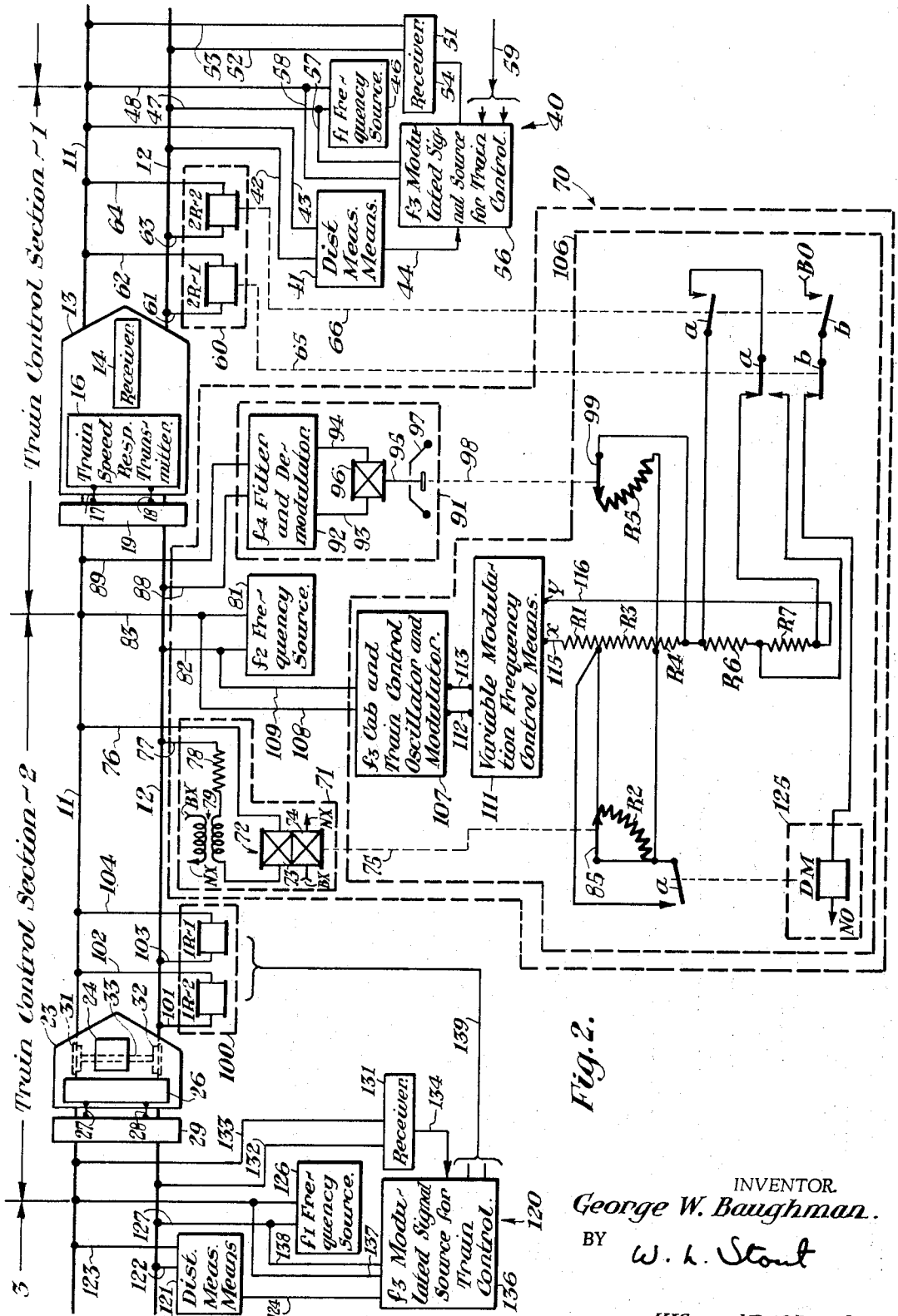
FIG. 2 depicts the essential circuit configuration which illustrates in detail the preferred embodiment of the invention.

Reference is now made to FIG. 1 in which there is depicted in the broader sense the major components involved in this invention. As can be seen from a study of this figure, there are depicted a pair of train control sections 1 and 2 which follow each other consecutively along a section of rail which has been schematically shown as a straight line. The rail which is divided into train control sections 1 and 2 is defined by train control means 40, 70 and 120, which define the boundaries of each train control section. The content of each train control means 40, 70 and 120 will be explained in more detail when a study of FIG. 2 is presented hereafter. Intermediate the train control means 40 and 70 there is a train detection means 60 which has been depicted secured to an intermediate point in the train control section 1. This train control means and its function will be explained more fully hereafter. It is sufficient to say at this time that the train detection means 60 has a pair of outputs 65 and 66 which are fed to the train control means 70, while the train detection means 100 positioned intermediate the train control means 70 and 120 has an output generally designated as 139 being fed to the train control means 120.

With this broad picture in mind, reference is now made to FIG. 2 in which there is depicted a full schematic diagram of a system embodying the invention. It should be recognized that this preferred embodiment which is set forth in a railway environment is merely exemplary, and that while each component set forth in this explanation is directed to a train, it should be recognized that the terminology is equally applicable to any vehicle provided that sufficient electrical interconnections are included to provide the type of train or vehicle control desired.

Now, specifically with reference to FIG. 2, there is depicted train control sections 1 and 2. In this system the trains 13 and 23, depicted respectively in control sections 1 and 2, are traveling upon a pair of electrically continuous rails 11 and 12. The train in the train control section 1, namely, train 13, has carried thereon a receiver 14 which picks up inductively from the rails, in a conventional manner not shown, the signals indicative of a train speed command being delivered to the train via the rails. Also included on the train 13 is a train speed responsive transmitter 16, which train speed responsive transmitter has an output which is a direct function of the actual speed of the train. This train speed responsive transmitter has been explained in detail in my copending application, Ser. No. 520,125, above referred to. It is sufficient to say that this train speed responsive transmitter may be driven at a rate dependent upon the rotary speed of any one of the wheels of the train not depicted. Therefore, this train speed responsive transmitter will produce a signal output which is indicative of the actual speed of the train or some fraction thereof.

An important aspect of this invention is the fact that the train speed responsive transmitter 16 always produces a signal indicative of a speed command which would be less than the actual speed at which the train is traveling. For example, the train speed command signal delivered by the train speed responsive transmitter 16 may be arbitrarily selected at 75% of the actual speed of the train 13. This train speed command signal from the train speed responsive transmitter 16 is delivered via the electrical leads 17 and 18 to a transmitting loop 19 positioned behind the train and above the rails. The transmitting loop 19 induces in the rails a signal indicative of the train speed command generated by the train speed responsive transmitter 16. Accordingly, should a train be immediately behind train 13, that is, within the same control section that the train 13 occupies, the only signal received by the following train would be that of the train speed responsive transmitter 16 which is, of course, at some fractional speed of the actual speed of train 13. One of the requirements of this system is that the trains operating within the system have both a train speed command receiver of the type designated with reference to this train 13, as well as a train speed responsive transmitter.

The second train depicted in train control section 2 schematically illustrates the fact that it also includes a train speed command receiver 24 as well as a train speed responsive transmitter 26 which is electrically connected to a transmitting loop 29 via electrical leads 27 and 28. Also depicted as present in the train 23 are one set of train wheels 31 and 32 interconnected by an axle 33 shown in a dotted configuration. It will be appreciated that these train wheels serve as a shunt across the rails and in this manner form a part of a circuit path which in part includes the rails 11 and 12. The wheels of train 13 also shunt the rails 11 and 12 and, while all the wheels of the trains are not shown, their presence is essential to provide an electrical shunt across the rails.

In a rapid transit environment in which rails such as 11 and 12 are not present, then it would be presumed that there would be positioned along the way a pair of electrically continuous conductors which would be shunted as the vehicles moved along the way. Keeping this in mind, let us return to the speed control system being described in the preferred embodiment of this invention.

As has been noted, the train control system has a series of consecutive train control sections, each of these train control sections being defined by the train speed control means 40, 70 and 120. An arrow leads from the reference numeral 40 and 120 to indicate the position of these train speed control means. The train speed control means 70 is shown in dotted outline to clearly designate the components included in train speed control means 70.

Each of the train speed control means basically includes the following components which may be grouped together in the right-hand portion of FIG. 2, designated by the reference numeral 40 and its associated arrow. This train speed control means includes a distance measuring means 41 which is electrically connected across the rails 11 and 12 by the electrical leads 42 and 43. The precise function of this distance measuring means will be explained in more detail with reference to a subsequent distance control means which will be described hereafter. It is sufficient to say at this time that the distance measuring means 41 of the train control means 40 has an output 44 indicative of train 13's distance from the point of electrical connection to the rails 11 and 12 by leads 42 and 43, or as will be seen, should a train have just passed the connection of the electrical leads 42 and 43 to the rails 11 and 12, then the indication 44 from the distance measuring means 41 will be influenced mainly by the vehicle nearest to the point at which the electrical leads 42 and 43 are secured to the rails 11 and 12.

There is also included at each train speed control means a wayside train detection signal source, here designated by the reference numeral 46. As a general practice, these train detection signal sources vary in the frequency of the signal delivered to the rails in an alternate fashion from one train speed control means to the next so that each train detection signal source is feeding a signal at a predetermined frequency to the rails and there is alternately positioned along the rails other train detection signal sources which have different frequencies. In this particular embodiment, the train detection signal sources may be alternated with every other train control section depicted. The precise function and interrelation of a train detection signal source with a train detection means, to be described hereafter, will be explained in more detail as the exposition of this invention proceeds. The train detection signal source 46 is electrically connected to the rails 11 and 12 via the leads 47 and 48.

There is a third component which is electrically secured to the rails 11 and 12 and is part of the train control means 40. This third component is a wayside receiver 51 which is electrically connected cross the rails 11 and 12 by electrical connections 52 and 53. The wayside receiver 51 receives signals which have been induced in the rails 11 and 12. The signals in the rails may have been supplied by a train such as train 13, the signal having originated in the train speed responsive transmitter and associated transmitting loop, which loop induces the signal in the rails as the vehicle or train passes the wayside receiver under consideration. The signal induced in the rails 11 and 12 and received by the wayside receiver 51 is a signal indicative of the actual speed of the train. Accordingly, the wayside receiver 51 would receive a signal via the rails 11 and 12 from a train not shown in this figure, positioned to the right of the electrical connection to the rails 11 and 12 of the electrical leads 52 and 53 from the receiver 51. This wayside receiver 51 has an output 54 which is indicative of the actual speed of the train which has just passed the point of the electrical connection to the rails 11 and 12 of the leads 52 and 53 from the receiver 51. The precise function of the output 54 from the wayside receiver will be explained in more detail hereafter. It should be recognized that this output from the wayside receiver 51 is delivered to a wayside variable signal transmitter 56, and this output from the receiver 51 functions as a control of the finally transmitted variable signal from the wayside variable signal transmitter 56. It can be seen, therefore, that the final component of each of the train speed control means is a wayside variable signal transmitter such as that designated by the reference numeral 56, and this wayside variable signal transmitter 56 is electrically secured to the rails via the electrical connections 57 and 58 which are respectively interconnected through the electrical leads 48 and 47 to the rails 11 and 12.

It will be appreciated that the wayside variable signal transmitter 56 is controlled by the output 44 from the distance measuring means 41 as well as the output from the wayside receiver 51, and by an additional pair of outputs generally designated by the reference numeral 59 from a train detection means positioned to the right of this control means 40 and not illustrated in this figure.

For purposes of illustration the train detection signal source 46 has been designated as having an *f1* signal being delivered to the rails 11 and 12.

The next appearing train speed control means, the position of which defines the entrance of train control section 1, is the train control means designated by the reference numeral 70, and in this figure is shown in a dashed outline configuration to facilitate an understanding of precisely what is included in a typical train speed control means of the type to be utilized in this invention. It should be recognized at this point that the train control sections 1 and 2, while set forth as having definitive beginnings and endings, the arrows utilized to designate the extent and length of the train control sections of course are meant only to show the general length of any typical train control section, and have been arbitrarily selected at a point intermediate the number of different electrical interconnections made to the electrically continuous rails 11 and 12. It should be appreciated that each of the electrical connections made to the rails from any one of the train speed control means might all be joined at a common point and therefore provide a very precise boundary line for each train control section. But for purposes of this illustration and to facilitate the understanding of the invention, many of the components of any one of the individual train speed control means 40, 70 or 120 have been shown having separate electrical connections to the rails and the description will proceed on the basis that it be understood that any and all of these electrical connections could be made at one point. This of course would precisely define the train control sections referred to hereafter. The train control means 70, as did the train control means 40, includes a distance measuring means 71, shown in dotted outline. The distance measuring means 71 is of the same general type depicted in and discussed in great detail in my copending application for Letters Patent of the United States, Ser. No. 360,351, filed Apr. 16, 1964, now Patent No. 3,309,516 for Railway Signaling Systems. It is sufficient to say for an understanding of the operation of this distance measuring device 71 that it includes a relay 72, which relay 72 has a first winding 73 and a second winding 74. The relay 72 is electrically connected across the rails 11 and 12 by the electrical leads 76 and 77, electrical lead 77 having a resistor 78 and an alternating source of current being delivered through a transformer 79 from the terminals BX and NX. The alternating current signal source BX, NX provides a reference current which will be impressed in the winding 73. It should be recognized that the winding 74 of the relay 72 has also an alternating current signal being delivered to it via the terminals BX and NX and the function of the windings 73 and 74 is that of a phase comparator. Accordingly, it will be seen that since alternating current energy is being delivered via the transformer 79 and its respective terminals BX and NX to the rails 11 and 12, this electrical energy of an alternating current nature will pass down the rail 12 through the wheels 32 and 31 and axle 33 of the train 23 and continue via the rail 11 and return to the relay 72 by electrical leads 76 connected to the rail 11. It is important to note at this time that since the rail 11 continues past the point of electrical connection to electrical lead 76, as does the rail 12 continue past the electrical connection from the electrical lead 77, the circuit just described also includes the rails 11 and 12 to the right of the electrical connections for electrical leads 76 and 77. Therefore, the circuit that includes the distance measuring means 71 includes that portion of the rails 11 and 12 to the right of these electrical connections all the way up to, and including that point at which the train 13 is shunting the rails by its wheels, which wheels of course are not shown in this figure. Since the distance measuring device 71 functions basically as a phase comparator, the train closest to the point of electrical connection to the rails of the distance measuring device 71 will have the major influence in controlling phase shift of the alternating current signal that passes through the circuit which includes the wheels of the train closest to the point of electrical connection to the rails 11 and 12.

In FIG. 2, since train 13 is closest to the electrical connection of leads 76 and 77 to the rails 11 and 12, this position of the train 13 will provide a path of least impedance for the alternating current delivered to the rails as aforementioned. This path of least impedance which includes the rails 11 and 12 between the train 13 and the electrical connections made by the leads 76 and 77 will exert a major influence on the distance measuring device 71 and its output 75. It is therefore evident that as the train 13 moves away from the distance measuring means electrical connection to the rails 11 and 12 the distance between the train 13 and the point of electrical connection of the distance measuring means 71 will increase and a point will be reached where the impedance presented by the intermediate section of rail between the train 13 and the point of electrical connection increases beyond that impedance presented by the rails 11 and 12 and the electrical shunt of the wheels of the following train 23. Therefore, the impedance of the rails 11 and 12 and the wheels of the following train 23, which shunt the rails, will then exert the major influence in control of the phase comparator output of the windings 72 and 73. As the train 23 approaches closer to the point of electrical connection of the rails 11 and 12 of the electrical leads 76 and 77 than the lead train 13, the train 23 will exert a progressively larger influence on the output 75 from the distance measuring means 71. Therefore, the output 75 of the distance measuring device 71 moves in a downward direction as the impedance presented to the pair of windings 73 and 74 of the distance measuring device 71 decreases. This downward movement causes wiper arm 85 to move across the resistance R2 which will in turn increase the resistance presented between points A and B of the circuitry depicted to the right of the resistance R2. The impedance decreases as the train 23 approaches the point of electrical connection made by the leads 76 and 77 and the impedance increases as the train 13 moves away from the position depicted in this figure. Therefore, should the train 23 remain in the position depicted and the train 13 move to the right, there would be an increase in impedance which would cause the output 75 of the distance measuring device 71 to move in an upward direction and control the movement of the wiper arm 85 to effectively decrease the resistance presented by resistance R2. The precise cooperation of this variable resistance R2 will be explained in more detail hereinafter.

Proceeding now in the same order that the components of the train speed control means 40 were described, the next component of the train speed control means 70 to be discussed will be train detection signal source 81. This train detection signal source 81 supplies electrical energy to the rails 11 and 12 via the electrical leads 82 and 83 at a designated $f2$ frequency. The function of this train detection frequency source in the role of train detection will be explained more fully hereafter. At this point it is sufficient to say that when no trains are present on the rails 11 and 12 to the right of the $f2$ frequency source 81, there is a circuit completed between the electrical leads 82 and 83, the rails 11 and 12, and a relay 2R–2 of a train detection means 60, which relay 2R–2 is connected electrically across the rails 11 and 12 by the leads 63 and 64. Relay 2R–2 of the train detection means 60 is energized when there is no train present between the point at which the electrical leads 82 and 83 of the train detection signal source 81 is connected to the rails and that point at which the relay 2R–2 of the train detection means 60 is connected to the rails by the electrical leads 63 and 64. The appearance of a train within this portion of the rails 11 and 12 between the points of electrical connection of the relay 81 and the relay 2R–2 will cause a shunting of the circuit and therefore deenergization of the relay 2R–2. The concomitant release of this relay 2R–2 will produce an output via the output 66 which will in effect open the contacts $a$ and $b$ of the relay 2R–2 in the manner depicted in this figure. At this point it should also be noted that the relay 2R–1 of the train detection means 60, which relay 2R–1 is connected across the rails 11 and 12 by the leads 61 and 62, receives its energy from the train detection signal source 46 which is electrically connected across the rails 11 and 12 via the electrical leads 47 and 48. It will be noted that in this particular figure that since no train is presently occupying the section of rails 11 and 12 between the point at which the relay 2R–1 is connected to the rails and the point at which the train detection signal source 46 of an $f1$ frequency is connected to the rails, this relay 2R–1 will receive energy and therefore will be in a picked-up condition. This will produce an output from relay 2R–1 such that the output designated by reference numeral 65 is in an up condition and the contacts $a$ and $b$ of this relay 2R–1 will complete circuits over the front contacts of this relay. It should be also recognized that because of the arrangement of the relays 2R–1 and 2R–2 there is in fact an overlapping of these train detection circuits which include the relays and their respective train detection signal sources 81 and 46. The precise function of these train detection signal sources and the manner in which they are controlled by the presence of a train within these train detection circuits will be explained more fully hereafter.

The next component of the train control means 70 to be described will be that of the wayside receiver 91 shown here in dashed outline. Wayside receiver 91 includes a filter and demodulator 92, which filter and demodulator is electrically connected across the rails 11 and 12 via the electrical leads 88 and 89. Wayside receiver 91 and its respective filter and demodulator 92 receive energy from the rails which has been induced therein by the train transmitter loop 19 of the train 13. These signals which have been induced in the rails are a function of the actual speed of the train 13, or to be more precise, are indicative of a more restrictive speed than the actual speed of the train 13. This signal from the train that is delivered to the rails has a carrier frequency of $f4$ and will differ to this extent from the signal delivered by wayside transmitter 106, to be described more fully hereafter. At this point it need only be recognized that there is a signal induced in the rails 11 and 12 immediately behind the train 13, or any train or vehicle passing the wayside receiver 91. This induced signal travels along the rails 11 and 12 into the electrical leads 88 and 89 where the signal is filtered and demodulated by the unit 92, and this produces a signal over the electrical leads 93 and 94 to a frequency responsive motor generally designated by the reference numeral 96. The frequency responsive motor 96 has a motor output 95 which drives a centrifugal speed responsive mechanism 97, which centrifugal speed responsive mechanism 97 in turn has a mechanical output 98. The mechanical output 98 is indicative of the frequency being delivered to the wayside receiver 91, and represents a physical measure of the speed of the train which has just passed the point at which the wayside receiver 91 is secured to the rails. In other words, the output 98 of this wayside receiver 91 will move in a downward direction as the frequency delivered by the transmitting loop of the train increases. This will be indicative of a more rapid actual train speed and therefore the continued downward movement of the output 98 is indicative of an increase in frequency being delivered by the train that has just passed. By way of summary, it may be stated that as the frequency increases with increase in train speed, the output 98 moves in a downward direction, controlling the movement of the wiper arm 99. As will be seen, the wiper arm 99 moves along the variable resistance R5, and this downward movement causes a decrease in the total resistance presented by the associated circuitry between the points X and Y depicted to the left of this resistance R5. The function of this circuitry will be described more fully hereafter.

If the train is stopped, of course no signal is being delivered by the transmitting loop 19 and the wayside receiver 91 and its related motor 96 have no physical rotary output. Accordingly, the output 98 of the wayside receiver 91 is at a standstill, and in this instance in its most upward position and the position of wiper arm 99 brings into effect the full resistance presented by resistance R5.

A more complete description of the function of this type of wayside receiver and frequency responsive associated motor may be found in my copending application for Letters Patent of the United States, Ser. No. 492,224, filed Oct. 1, 1965, for Train Speed Control System.

Finally, the last major component of the train control means 70 is shown in this figure outlined in dotted form and designated by reference numeral 106. This is the wayside variable signal transmitter 106, and this wayside variable signal transmitter 106 includes a train control oscillator and modulator 107 which is connected via the electrical leads 108 and 109, and the electrical leads 82 and 83, respectively, to the rails 11 and 12. Over these electrical leads 82 and 83, a wayside variable frequency signal is delivered to the rails for conduction by the rails 11 and 12 to an approaching train, in this instance train 23. The signal is picked up from the rails by coils on the train 23 (not shown) and delivered to the receiver 24 on the train 23. The control of this variable signal transmitter 106 will be described more fully at this time.

As has been noted, there is a train controlled oscillator and modulator 107 which is electrically connected to a variable modulation frequency control means 111 via the electrical leads 112 and 113. This variable modulation frequency control means 111 includes as an integral part thereof a circuit which has been designated as including the electrical leads 115 and 116 emanating from points X and Y, which circuit has interposed therebetween a number of resistances R1, R2, R3, R4, R5, R6 and R7. It should be recognized that this variable modulation frequency is designed to provide changes in the final frequency of the variable frequency transmitter output as a function of the addition or subtraction of additional resistance between the points X and Y of the variable modulation frequency control means 111. The variable oscillator device 111, here designated as a variable modultation frequency control means, is of a convention nature and a detailed description thereof may be found in my copending application for Letters Patent of the United States, Ser. No. 360,351, filed Apr. 16, 1964, for Railway signaling Systems.

To understand the invention it need only be recognized that a change in the total resistance between the points X and Y or the variable modulation frequency control means 111 will produce a resultant change in the output-frequency from the wayside variable signal transmitter 106. Therefore, the following parameters must be kept in mind. By the very design of this variable modulation frequency control means 111 an increased in total resistance between the points X and Y produces a decrease in the frequency of the signal to be relivered to the rails from the wayside variable signal tranmitter 106, and a decrease in the total resistance across the points X and Y will produce an increase in frequency of the signal being delivered to the rails from the variable signal transmitter 106. In addition, it should be kept in mind that the higher the frequency of the signal delivered to the rails the greater will be the authorized speed of the approaching train and this higher frequency will arise as the total resistance across the points X and Y is lowered.

Studying now just the circuitry that is interposed between the points X and Y of the variable modulation frequency control means 111, it will be seen that there is a resistance R1 that is always present in the circuit. The next resistance depicted immediately beneath the resistance R1 is a resistance R3 which has in parallel therewith a resistance R2, and this resistance R2 is of a variable nature controlled by the movement of the wiper arm 85. It should be recalled at this time that the movement of the wiper arm 85 is a function of the distance of one or both of the trains from the point at which the distance measuring means 71 is electrically secured to the rails 11 and 12. The train closest to the point of electrical connection to the rails 11 and 12 exerts the major control of the position of the output 75 of the train distance measuring means 71. Therefore, the downward movement of the output 75 of the distance measuring means 71 will be indicative of the fact that a train is getting closer to the point of electrical connection to the rails 11 and 12 of the distance measuring device 71, and as will be appreciated this downward movement of the output 75 will cause the wiper arm 85 to move downward across the resistance R2 and therefore increase the resistance in parallel with the resistance R3 and this will in effect add to the total resistance in the circuit between points X and Y. This additional resistance will effect a control of the variable wayside signal transmitter output in a manner which indicates a need for a decrease in speed as the train approaches the point at which the distance measuring device 71 is secured to the rails 11 and 12.

At this time it should be pointed out that there are circumstances in which this positive distance measuring train speed control must be overridden in order to provide a smooth rapid transit speed control program. In other words, should the situation occur where there is no train in the position shown by the train 13 in the train control section 1, then there must be some means to cause a deactivation or disabling of this distance measuring means 71, because the train 23 must of necessity continue its speed uninhibited by the fact that it is approaching the point in the rails 11 and 12 where the distance measuring device 71 has been connected. This will occur when there is no train present in the train control section 1 and the train detection circuits described earlier, which supply the energy to the relays 2R–1 and 2R–2, are not being shunted. The effect of this is to cause both the outputs 65 and 66 of the train detection means 60 to be in a picked-up condition. When this occurs, it will be seen that a circuit is completed over the front contact b of the relay 2R–2, the front contact b of the relay 2R–1, which allows the passage of energy from the battery terminal BO to a disabling relay DM, and from the disabling relay DM the circuit is completed through the battery terminal NO. This disabling relay DM is generally designated by the reference numeral 125 and is referred to hereafter as a distance measuring disabling means. It will be seen that with this relay DM energized, the relay is in a picked-up condition and its contact a comes into contact with the front contact of this relay and thereby provides an effective shunt of the variable resistance R2. Therefore, while the distance measuring device 71 continues its function of measuring the distance which the train 23 is from the point of connection to the rails 11 and 12 by the distance measuring device, this has no effect on the variable signal being delivered to the rails 11 and 12 from the wayside transmitter 106. In other words, the movement of the wiper arm 85 in this instance is a nullity because of the fact that control section 1 is unoccupied.

Going further now, the next resistance in the circuit between the points X and Y is resistance R4. Resistance R4 has in parallel therewith a variable resistance R5, which variable resistance R5 is controlled as a function of the movement of wiper arm 99, and as has been pointed out earlier, this movement of the wiper arm 99 is a direct function of the output movement from the wayside receiver 91 as evidenced by the upward or downward movement of the output 98. When the output 98 of the wayside receiver 91 moves downward the wiper arm 99 also moves in a downward direction. This downward movement occurs when the frequency being received from a train that has passed increases. Therefore, we will see that the resistance R5 decreases as the speed of the train which has just passed the points on the rails at which the receiver 91 is electrically connected, and this of course will continue to decrease the resistance of R5 in parallel with the resistance R4, producing an overall decrease in the resistance between the points X and Y of the variable modulation frequency control means 111. This decrease in resistance would contribute to an increase final variable signal output delivered to the rails and the next following train would receive a signal indicative of a permissible higher speed. By the same token, should the train 13 be in a standing position, there would be no movement of the wiper arm 99, and of course there would be the maximum resistance available in resistance R5 and there would be in parallel across the resistance R4 the additional resistance of resistance R5 which of course would produce an indication indicative of a more restrictive speed needed by a following train.

The next two resistances that are included in the circuit between the points X and Y are resistances R6 and R7. It will be seen that these resistances R6 and R7 are effectively added to or removed from the circuit between the points X and Y by the presence of a train 13, or any vehicle which has entered the train control section 1 and has shunted the train detection circuits which include the relays 2R–1 and 2R–2. The precise wayside transmitter control effect brought about by the movement of a train, such as train 13 into the train control section 1, will be explained more fully in the description which follows with reference to FIGS. 3 through 5.

Attention is now directed to the last remaining train control means 120 which is positioned at the entrance portion of the train control section 2. For purposes of explanation it need only be noted that there is provided, as in the other train control means 40 and 70, a distance measuring means 121 which is electrically connected across the rails 11 and 12 via the electrical leads 122 and 123, and this distance measuring means has an output 124 which in part controls the variable signal output from the $f3$ modulated signal source 136. There is also present in this train control means a train detection $f1$ frequency source 126 electrically connected across the rails 11 and 12 via the electrical leads 127 and 128. In a similar manner a wayside receiver 131 is electrically connected across the rails via the leads 132 and 133, this wayside receiver having an output 134 which in part controls the variable train control signal delivered to the rails from the wayside transmitter 136. The variable train control signal from wayside transmitter 136 is delivered to the rails via the electrical leads 137 and 138 and the electrical leads 128 and 127, respectively. In addition, there is a train detection control present in train detection means 100 which is positioned intermediate the train control section 2. The train detection means 100 having a relay 1R–2 and a relay 1R–1 is electrically connected across the rails 11 and 12 via the electrical leads 101, 102, 103 and 104, respectively. The train detection means 100 has an output 139 which provides a control function similar to the control exercised by outputs 65 and 66 of train detection means 60 which will be explained more fully hereafter. The output 139 is fed to the wayside variable signal transmitter 136.

*Operation of the system*

Reference is now made to FIGS. 3 through 5 which are intended to depict situations in which a train designated A and a train designated B are positioned and controlled by the invention embodied in this system. It should be recognized that, while the examples given in FIGS. 3 through 5 would appear to be a static description of the controls provided to following trains, these are in fact potentially dynamic circumstances which of course may only be depicted by an illustration which shows the respective trains A and B in a number of distinct positions along the rails.

In order to fully appreciate the controls to be provided and illustrated in these FIGS. 3 through 5, it should be understood that the trains A and B are shown in the first instance in a solid outline form, and a second position of either train will be shown with that train in dotted outlined configuration.

Therefore, with reference to FIG. 3, there is depicted a train B just entering control section 2, while the train A will first be described as standing at the entrance of control section 1 (shown in a solid outlined configuration). The effect on the system of the train A being positioned at the exit end of the control section 1 will be discussed secondly, and it will be appreciated that when the train has assumed the positions denoted by the dotted outline, the respective movement of the pertinent contacts and the effect on the circuitry will be manifested by a showing of the contacts of the respective controlling elements shown in dotted fashion to indicate the effect of the train A or B assuming a second and different position.

Starting first with FIG. 3 and the prestated fact that train A at the entrance end of control section 1 is standing. When train A is standing there is no output from the train speed responsive transmitter on the train and therefore there will be no signal delivered to the rails. Accordingly, the wayside receiver 91 shown secured to the rails will not receive a signal, and this receiver 91 will not effect a physical movement of output 98, which of course will cause the wiper arm 99 to maintain its position with the resistance R5 at its maximum in parallel with resistance R4. The fact that the train A is shown standing at the entrance end of the train control section 1 will also bring about the deenergization of the relay 2R–2 because the lead train A is occupying the circuit that includes both the train detection signal source 81 of frequency $f2$ and its related relay 2R–2. Accordingly, the relay 2R–2 will be deenergized and its output 66 will be in a released or down position, thereby opening the front contacts $a$ and $b$ of the relay 2R–2. This in effect will cause two conditions to arise. First, the circuit which includes the distance measuring disabling means 125 and the relay DM of this distance measuring means 125 will have its supply of energy from the battery terminals BO and NO broken at the point where the front contact $b$ of relay 2R–2 has been opened. This of course will cause the distance measuring disabling means 125 to release, opening the front contact $a$ of relay DM and permitting in this instance the distance measuring means 71 and its related output 75 to bring into effect the variable resistance R2 in a manner now to be described.

Since train A is standing nearest the distance measuring means 71 and the impedance of the rails between the distance measuring means 71 and the train A is low, the train A standing where it is at the entrance of control section 1 will control the distance measuring means 71. In so doing the indication from the distance measuring means 71 will be that of the most restrictive speed permissible and this of course will add the resistance R2 in parallel with the resistance R3. In other words, the full resistance of R2 as well as the full resistance of R5 has been added in parallel to R3 and R4 in the circuit between the points X and Y to effect a control of the modulated signal source for the train arrangement depicted here.

As has been stated, since the relay 2R–2 has been deenergized, opening its front contacts $a$ and $b$, this will permit the addition of resistance R6 into the circuit between the points X and Y. This addition of resistance to the circuit between points A and B is indicative of a more limited speed command to be delivered to the rails and therefore to the train B.

The next situation depicted here is with the train A standing at the exit end of train control section 1; here the train A is shown in dotted outline. The effect of the train A at the exit end of the control section 1 is as follows: Since the train A has left the train detection circuit which includes the relay 2R–2, this relay will then be picked up, and as depicted here in its dotted fashion, the relay 2R–2 will therefore close the front contacts $a$ and $b$ of the relay 2R–2. On the other hand, the presence of the train A at the exit of control section 1 causes the shunting of the $f1$ energy source 46 at the exit end of control section 1 and the relay 2R–1 is deenergized, thereby opening the front contacts $a$ and $b$ of this relay, and in this particular instance closing the back contact $a$ of relay 2R–1, which in effect adds the resistance R7 to the circuit between the points X and Y while simultaneously removing the resistance R6. In other words, resistance R7 is substituted for resistance R6. This fact will be evidenced from a study of the electrical circuits completed when the contact $a$ of relay 2R–2 is picked up and the contact $a$ of relay 2R–1 is released, thereby effecting a shunt around resistance R6 over the back contact *a* of relay 2R-1 and the front contact *a* of relay 2R-2.

Since the train A shown in dotted outline at the exit end of the control section 1 is standing, there is no output signal from its train speed responsive transmitter, and therefore the wayside receiver 91 receives no input and has no output. The wiper arm 99 accordingly remains in the position it was when the train was standing at the entrance end of the control section 1. The repositioning of the train A will work a change in the distance measuring means output 75. Since the train A has moved from the entrance end of the control section 1 to the exit end of the control section 1 there has been a change in impedance of a nature such that the impedance between the point at which the distance measuring device is connected to the rails and either train is approximately equal. This will cause the output from the distance measuring device to move in an upward direction, thereby reducing the variable resistance R2 in parallel with resistance R3 which of course will be reflected in a decrease in resistance between the points X and Y. This decrease in resistance of course is indicative of an increase in maximum permissible speed and therefore the signal delivered to the rails to control the speed of the train B when the train A has assumed its second position will be one which permits the train B to have an increased speed command delievered to the rails from the wayside variable signal transmitter 106.

It should be recognized at this point that the selection of the various resistances R1 through R7 is a matter of design and the selection of these resistances will determine the amount of control exerted by the addition or subtraction of variable resistances to the circuit between the points X and Y as the trains move through the system.

Reference is now made to FIG. 4 in which the train B is in solid lines positioned approximately midway through the control section 2 and the train A is positioned midway through the control section 1. In this situation, it will be appreciated that since both the train B and the train A are midway between their respective control sections 2 and 1, the relative impedance offered by the rails between the distance measuring means 71 and each of the trains is about the same, and therefore the output 75 from the distance measuring means 71 has caused the contact arm 85 of the variable resistance R2 to assume a position approximately midway along the resistor R2. This, therefore, places in parallel with resistor R3 half the total resistance of variable resistor R2. In this situation now being described the train A shown in solid lines is standing and therefore there is no output from its transmitter being induced in the rails, and the wayside receiver 91 does not receive a signal and the wiper arm 99 controlled by the output 98 of the wayside receiver 91 does not move. Accordingly, there is maintained in parallel with the resistor R4 the full resistance of R5.

There is though in effect an additional speed control effected when the train A, shown in solid lines, is standing in the position depicted midway through the control section 1. Since the train A is standing within both of the track detection circuits that include the respective detection signal sources 81 and 46, both relays 2R-1 and 2R-2 are deenergized because the wheels of the train A shunt the circuits, thereby preventing the passage of energy from the respective train detection frequency sources 81, 46 to the respective relays. The release of both relays 2R-1 and 2R-2 will result in a change of the total resistance of the circuitry between the points X and Y of the variable modulation frequency control means 111. The release of relays 2R-1 and 2R-2 produces the following effect: The release of relay 2R-2 opens the front contact *a* of relay 2R-2 as well as the front contact *b* of relay 2R-2. At the same instant, the deenergization of relay 2R-1 opens the front contacts *a* and *b* of relay 2R-1 while simultaneously closing the back contact *a* of relay 2R-1. This in effect includes in the circuit between the points X and Y both the resistances R6 and R7 which would therefore have the effect on the variable signal transmitter of decreasing the frequency delivered to the rails and therefore would be indicative of a more restrictive speed.

When the train A has assumed its position shown dotted, namely, to the right of control section 1, the following occurs: Since the train A no longer is in a position to affect the track circuits which include the relays 2R-1 and 2R-2, there relays, in their picked-up state, complete a circuit over the front contact *b* of relay 2R-2, the front contact *b* of relay 2R-1, with the negative and positive battery terminals NO, BO which supply power to the distance measuring disabling means 125. This causes the relay of the distance measuring disabling means 125 to be energized and in so doing close the front contact *a* of the relay DM and cause the variable resistance R2 which is indicative of the distance to be shunted out of the circuit between points X and Y, and any changes in the resistance R2 are no longer effective in the control of the approaching train B. Under these circumstances it will be appreciated that the train B therefore will receive a signal indicative of the fact that it may proceed at some speed less than maximum speed into control section 1, and it may be presumed that when the train B does enter control section 1 it will then come under the influence of the wayside variable signal transmitted 56 at the exit end of control section 1.

Reference is now made to FIG. 5 which depicts the train A shown in solid lines, in the first instance moving at a speed between 40 and 75 miles per hour. There is therefore induced in the rails immediately behind the train A a signal indicative of the fact that the train is moving at 40 to 75 miles per hour and this signal commands a speed that is less than the speed range of 40 to 75 miles per hour. This signal induced in the rails behind the train A would be received by the wayside receiver 91 which would translate this signal into a movement of the output 98 which in turn would cause the wiper arm 99 to move to a position along the variable resistance R5. In this instance, the movement would be approximately half the distance of the variable resistance R5. This would therefore place in the circuit between points X and Y half of R5's resistance in parallel with the resistance R4 and this would produce a change in the overall resistance between the points X and Y of the variable modulation frequency control means 111.

The fact that the train A is nearest to the distance measuring means 71 causes train A to have principal control over the output 75 of the distance measuring means 71, and since the train is nearest the distance measuring means 71 the train A, even though moving, would cause the output 75 of the distance measuring means 71 to move the wiper arm 85 into its downward position indicative of maximum resistance and therefore call for a component of control which would indicate a more restrictive speed. This, of course, is logical in view of the fact that should a following train B approach the distance measuring point even though the train A is moving, it would be desirable to restrict to some degree the speed of the following train B.

The position of the train A, shown in solid lines, effects only one of the train detection control circuits, namely, that which includes the relay 2R-2 and in so effecting this circuit the relay 2R-2 is deenergized, opening the front contacts *a* and *b* of the relay 2R-2 which causes the resistances R6 and R7 to be included in the circuit between the points X and Y. Simultaneously, with the appearance of the addition of resistances R6 and R7 to the circuit between the points X and Y, it will be appreciated that the opening of the front contact *b* of the relay 2R-2 interrupts the flow of energy from the battery terminal BO to the distance measuring disabling means 125 and its relay DM, which therefore causes the front contact *a* of the relay DM to open, thereby removing the shunt of the variable resistance R2 as has been noted with reference to FIG. 4. Under these circumstances the resistance R2 and the distance measuring means will function to control in a variable manner the resistance R2 to insert into the circuit between the points X and Y more or less resistance dependent upon the distance of the nearest vehicle to the distance measuring means 71.

When the train B assumes the positions shown in dotted outline and the train A assumes the speed of 75 miles per hour and the position shown in dotted outline, the following circuit parameters are changed between the points X and Y. The fact that the train B has reached an intermediate position in the control section 2, and this is closer to the distance measuring means 71 than the train A, the train B and its actual physical position in control section 2 will take principal control over the output 75 of the distance measuring means 71. Therefore, the new position shown dotted of the wiper contact arm 85 along resistance R2 will depend mainly upon the distance train B is away from the distance measuring means 71. In this instance we can see that the train A no longer exercises major control over the distance measuring means output 75 and it is mainly the distance between the distance measuring means 71 and train B that controls this component of control over the final signal delivered to the rails from wayside transmitter 70 to command the speed of the train B.

Since the train A has assumed its position shown dotted the circuit between the battery terminals B and N, which includes the distance measuring disabling means 125, will be interrupted because the relay 2R-1 will have had its source of energy effectively shunted by the presence of the train A in its position near the exit end of the control section 1. This shunting causes the front contact b of the relay 2R-1 to be opened and of course no energy is delivered to the relay DM and therefore there is no effective shunting out of the distance measuring means output 75 which has been controlled by the movement of the train B from the dotted position. When the train A is in the dotted position, the contacts of the relays 2R-1 and 2R-2 will assume their dotted position and this effectively causes the resistance R6 to be shunted out of the circuit between points X and Y while the resistance R7 is included in the circuit and to the extent that resistance R7 adds to the total resistance between the points X and Y it effects a control in the final output frequency delivered to the rails which in turn controls the speed of the following train.

While not illustrated herein specifically it should be recognized that should the train B at any time pass an end of a control section and enter a control section occupied by a lead train A, then the exclusive control of the train B would be taken over by the signal which emanates from the rear of the train A and has been induced in the rails immediately behind the train. It should be recognized also that since this speed is always indicative of a speed less restrictive than the actual speed of the lead train, the following train can never overtake the lead train and come into collision therewith. Further, it should be recognized that while the speed command receivers positioned on the train have not been discussed in detail, all the receivers on the trains operating in this system would have to be able to receive modulated frequency signals delivered from the rear of the lead train as well as the modulated frequency signals delivered from the wayside. These types of receivers which are selective in their nature of course are well known in the art and any receiver may be readily tuned to pick up two different types of control signals being delivered to it.

The system has been described in an environment where there are electrically continuous rails, or in the alternative the electrically continuous rails may take the equivalent form of electrically continuous elements positioned along the wayside. The vehicle of the system described includes means to shunt these electrically continuous elements.

The system may also be modified to include the presence of insulated joints and these insulated joints may be placed just after the point of electrical connection to the rails of the distance measuring means. The inclusion of insulated joints in the system would remove the system's capacity to measure the distance to the lead train from the distance measuring means since an insulated joint would be interposed between the distance measuring means and the lead train. There may very well be situations where this type of insulated joint may fit within the needs of the system. Such situations may well arise where the system is employed near a station area and it becomes desirable to have the following train approach very closely to the rear of the lead train and in fact have its stop controlled in a precise manner. This precise stopping would of course arise where there was an insulated joint utilized because the full control of the train would come from the distance measuring device as the train approached closer to the particular distance measuring means before an insulated joint.

While the present invention has been illustrated and described in connection with the details of the illustration embodiments thereof, it should be understood that those are not intended to be limitative of the invention as set forth in the accompayning claims.

Having thus described my invention, what I claim is:

1. A vehicle speed control system for use along a way characterized by the presence of a series of consecutive vehicle speed control sections and where each of the vehicles operating within the system has a vehicle speed command receiver and a vehicle speed responsive transmitter which has an output signal which is effective in the control of following vehicles and which output signal is always indicative of a more restrictive vehicle speed command than any vehicle speed command received by said vehicle speed command receiver,
   (a) said control sections being defined by a plurality of spaced apart vehicle control means,
   (b) each of said vehicle control means including,
      (1) a vehicle distance measuring means having an output which is indicative of the distance to the vehicle nearest the vehicle control means which includes said vehicle distance measuring means,
      (2) a vehicle detection signal source which varies in character from any one control means to the next adjacent control means,
      (3) a wayside receiver having an output indicative of said output signal received from said vehicle speed responsive transmitter when a vehicle has just passed any one of said wayside receivers and is occupying the adjacent control section entered,
      (4) a wayside variable signal transmitter which has an output signal which is received by the vehicle speed command receiver and controls said vehicle's speed entering the preceding vehicle control section,
   (c) a pair of vehicle detection means positioned intermediate the ends of each vehicle control section,
      (1) one of said pair of vehicle detectors energized by the vehicle detection signal source of the preceding vehicle control means and the other of which is energized by the vehicle detection signal source of the next succeeding vehicle control means,
      (2) said pair of vehicle detection means, each having an output which is controlled by the passage of said vehicle through said control section,
   (d) said wayside variable signal transmitter output simultaneously controlled by said outputs from said vehicle distance measuring means, said wayside receiver and said pair of vehicle detection means.

2. The vehicle speed control system of claim 1 which includes vehicle distance measuring disabling means controlled by said pair of vehicle detection means to render ineffective said distance measuring means when the next succeeding control section is unoccupied.

3. The vehicle speed control system of claim 1 wherein said pair of vehicle detection means are positioned with reference to their respective signal source such that a vehicle occupying a vehicle control section will always control at least one of said pair of vehicle detection means.

4. The vehicle speed control system of claim 1 wherein said consecutive vehicle control sections include a pair of electrically continuous elements.

5. The vehicle speed control system of claim 4 wherein said vehicle distance measuring means is coupled electrically to said pair of electrically continuous elements.

6. The vehicle speed control system of claim 5 wherein said vehicle detection signal source and said pair of vehicle detection means are connected across said pair of electrically continuous elements, each of said vehicles having shunting means effective to shunt said pair of electrically continuous elements as said vehicle moves along said way.

7. The vehicle speed control system of claim 4 wherein said wayside receiver is electrically connected across said electrically continuous elements and said vehicle speed responsive transmitter includes means to induce in said electrically continuous elements said speed responsive transmitter output.

8. The vehicle speed control system of claim 4 wherein said wayside variable signal transmitter is electrically connected across said pair of electrically continuous elements and said output signal from said variable signal transmitter is a modulated frequency output which frequency of modulation is a function of a lead vehicle's speed; the relative distance between vehicles and the vehicle control means, whenever a vehicle control means is intermediate vehicles operating within said system; and finally the position assumed by a lead vehicle as it moves through said vehicle control sections.

9. The vehicle speed control system of claim 8 wherein said vehicle speed command receiver includes means to inductively detect from said electrically continuous elements said modulated frequency output signal of said wayside transmitter.

10. A vehicle speed control system for use along a way characterized by the presence of a series of consecutive vehicle speed control sections and where each of the vehicles operating within the system has a vehicle speed command receiver and a vehicle speed responsive transmitter which has an output signal which is effective in the control of following vehicles and which output signal is always indicative of a more restrictive vehicle speed command than any vehicle speed command received by said vehicle speed command receiver,
  (a) said control sections being defined by a plurality of spaced apart vehicle control means,
  (b) each of said vehicle control means including,
    (1) a vehicle distance measuring means having an output which is indicative of the distance to the vehicle nearest the vehicle control means which includes said vehicle distance measuring means,
    (2) a vehicle detection signal source,
    (3) a wayside receiver having an output indicative of said output signal received from said vehicle speed responsive transmitter when a vehicle has just passed only one of said wayside receivers and is occupying the adjacent control section entered,
    (4) a wayside variable signal transmitter which has an output signal which is received by the vehicle speed command receiver and controls said vehicle's speed entering the preceding vehicle control section,
    (5) a vehicle distance measuring disabling means,
  (c) vehicle detection means positioned intermediate the ends of each vehicle control section and energized by said vehicle detection signal source, said vehicle detection means having an output indicative of the occupancy of said control section,
    (1) said vehicle distance measuring disabling means controlled by said vehicle detection means output to render ineffective said distance measuring means when the next succeeding control section is unoccupied,
  (d) said wayside variable signal transmitter output, simultaneously controlled by said outputs from said vehicle distance measuring means, said wayside receiver and said vehicle detection means.

11. The vehicle speed control system of claim 10 wherein said consecutive vehicle control sections include a pair of electrically continuous elements:

12. The vehicle speed control system of claim 11 wherein said vehicle distance measuring means is coupled electrically to said pair of electrically continuous elements.

13. The vehicle speed control system of claim 12 wherein said vehicle detection signal source and said vehicle detection means are connected across said pair of electrically continuous elements, each of said vehicles having shunting means effective to shunt said pair of electrically continuous elements as said vehicle moves along said way.

14. The vehicle speed control system of claim 11 wherein said wayside receiver is electrically connected across said electrically continuous elements and said vehicle speed responsive transmitter includes means to induce in said electrically continuous elements said speed responsive transmitter output.

15. The vehicle speed control system of claim 11 wherein said wayside variable signal transmitter is electrically connected across said pair of electrically continuous elements and said output signal from said variable signal transmitter is a modulated frequency output which frequency of modulation is a function of a lead vehicle's speed; the relative distance between vehicles and the vehicle control means, whenever a vehicle control means is intermediate vehicles operating within said system; and finally the position assumed by a lead vehicle as it moves through said vehicle control sections.

16. The vehicle speed control system of claim 15 wherein said vehicle speed command receiver includes means to inductively detect from said electrically continuous elements said modulated frequency output signal of said wayside transmitter.

17. A train speed control system for use in territory characterized by the presence of electrically continuous rails and where each of the trains operating in the system has a train speed command receiver and a train speed responsive transmitter which has an output signal which is effective in the control of following trains and which output signal is always indicative of a more restrictive train speed command than any train speed command being received by said train speed command receiver,
  (a) said rails including a series of consecutive train speed control sections,
  (b) said control sections being defined by a plurality of spaced apart train control means,
  (c) each of said train control means including,
    (1) a train distance measuring means electrically coupled to said rails and having an output which is indicative of the distance to the train nearest said distance measuring means electrically coupled to said rails,
    (2) a train detection signal source electrically coupled to said rails which varies in character from any one control means to the next adjacent control means,
    (3) a wayside receiver having an output indicative of said output signal received from said train speed responsive transmitter when a train has just passed any one of said wayside receivers and is occupying the adjacent control section entered, (4) a wayside variable signal transmitter which has an output signal which is received by the train speed command receiver on a train entering the preceding train control section, said variable output signal controls the speed of said train entering said preceding section, (d) a pair of train detection means positioned intermediate the ends of each train control section, electrically coupled to said rails, (1) one of said pair of train detectors energized by the train detection signal source of the preceding train control means and the other of which is energized by the train detection signal source of the next succeeding train control means, (2) said pair of train detection means each having an output which is controlled by the passage of said train through said control section, (e) said wayside variable signal transmitter output simultaneously controlled by said outputs from said train distance measuring means; said wayside receiver and said pair of train detection means, whereby said trains operating within said system are mutually controlled as a function of a lead train's speed, the relative distance between trains and the train control means, whenever a train control means is intermediate trains operating within said system; and finally the position assumed by a lead train as it moves through said train control sections.

18. The train speed control system of claim 17 which includes train distance measuring disabling means controlled by said pair of train detection means to render ineffective said distance measuring means when the next succeeding control section is unoccupied.

19. The train speed control system of claim 17 wherein said pair of train detection means are positioned with reference to their respective signal source such that a train occupying a train control section will always control at least one of said pair of train detection means.

20. The train speed control system of claim 17 wherein said train distance measuring means is coupled electrically to said pair of electrically continuous rails.

21. The train speed control system of claim 20 wherein said train detection signal source and said pair of train detection means are connected across said pair of electrically continuous rails, each of said train wheels shunting said rails as said train moves along said rails.

22. The train speed control system of claim 17 wherein said wayside receiver is electrically connected across said electrically continuous rails and said train speed responsive transmitter includes means to induce in said rails said speed responsive transmitter output.

References Cited

UNITED STATES PATENTS

| | | |
|---|---|---|
| 1,627,748 | 5/1927 | Rowntree. |
| 3,038,066 | 6/1962 | Barry _____ 246—182 XR |
| 3,078,944 | 2/1963 | Gray. |
| 3,305,682 | 2/1967 | Bolster et al. _____ 246—167 |

ARTHUR L. LA POINT, *Primary Examiner.*

S. T. KRAWCZEWICZ, *Assistant Examiner.*